United States Patent
Lee et al.

(10) Patent No.: US 11,230,160 B2
(45) Date of Patent: Jan. 25, 2022

(54) AIR CONDITIONER FOR VEHICLE

(71) Applicant: Hanon Systems, Daejeon (KR)

(72) Inventors: Jong Min Lee, Daejeon (KR); Jae Woo Ko, Daejeon (KR); Young Keun Kim, Daejeon (KR)

(73) Assignee: Hanon Systems, Daejeon (KR)

( * ) Notice: Subject to any disclaimer, the term of this patent is extended or adjusted under 35 U.S.C. 154(b) by 268 days.

(21) Appl. No.: 16/282,405

(22) Filed: Feb. 22, 2019

(65) Prior Publication Data

US 2019/0263221 A1    Aug. 29, 2019

(30) Foreign Application Priority Data

Feb. 27, 2018    (KR) .................. 10-2018-0023651

(51) Int. Cl.
*B60H 1/00* (2006.01)
*F16H 55/26* (2006.01)

(52) U.S. Cl.
CPC ......... *B60H 1/00692* (2013.01); *F16H 55/26* (2013.01); *B60H 2001/007* (2013.01)

(58) Field of Classification Search
CPC .......... B60H 1/00692; B60H 2001/007; F16H 55/26
USPC ...................................................... 454/145
See application file for complete search history.

(56) References Cited

U.S. PATENT DOCUMENTS

| | | | | |
|---|---|---|---|---|
| 6,305,462 | B1 * | 10/2001 | Tsurushima | B60H 1/0005 165/103 |
| 2009/0197517 | A1 * | 8/2009 | Wang | B60H 1/00692 454/145 |
| 2011/0197512 | A1 * | 8/2011 | Nomura | B60H 1/00692 49/70 |
| 2014/0308890 | A1 * | 10/2014 | Schneider | B60H 1/00857 454/335 |
| 2016/0243922 | A1 * | 8/2016 | Sekito | B60H 1/12 |
| 2018/0163828 | A1 * | 6/2018 | O'Hara | F16H 1/00 |

FOREIGN PATENT DOCUMENTS

| | | |
|---|---|---|
| DE | 112014004996 T5 | 7/2016 |
| WO | 2011162232 A1 | 12/2011 |

* cited by examiner

*Primary Examiner* — Allen R. B. Schult
(74) *Attorney, Agent, or Firm* — Norton Rose Fulbright US LLP; James R. Crawford

(57) ABSTRACT

The present invention relates to an air conditioner for a vehicle, which can prevent misassembly of doors and prevent damage of gears when one rack gear operates two sliding doors and increase the degree of mounting freedom of actuating means. The air conditioner for a vehicle, which includes an air-conditioning case having a heat exchanger, and a door disposed inside the air-conditioning case and sliding to adjust the degree of opening of an air passageway, includes: shafts having a first gear part geared with gear teeth formed on the door. One or more misassembly preventing parts are formed on the shafts and the first gear part.

8 Claims, 9 Drawing Sheets

PRIOR ART

AIR CONDITIONER FOR VEHICLE

This patent application claims priority from Korean Patent Application No. 10-2018-0023651, filed Feb. 27, 2018, which is hereby incorporated herein by reference in its entirety for all purposes.

BACKGROUND OF THE INVENTION

Field of the Invention

The present invention relates to an air conditioner for a vehicle, and more particularly, to an air conditioner for a vehicle which includes a door disposed inside an air-conditioning case to adjust the degree of opening of an air passageway of air discharged to the interior of the vehicle.

Background Art

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

FIG. 1 is a sectional view showing a conventional air conditioner for a vehicle. As shown in FIG. 1, the conventional air conditioner 1 for a vehicle includes an air-conditioning case 10, an air blower (not shown), an evaporator 2, a heater core 3, and temperature adjusting doors 18 and 19.

An air inflow port 11 is formed at an inlet of the air-conditioning case 10, a defrost vent 12, a face vent 13 and a floor vent 14 for adjusting the degree of opening by mode doors 15, 16 and 17 are formed at an outlet of the air-conditioning case 10. The air blower is connected to the air inflow port 11 of the air-conditioning case 10 to blow indoor air or outdoor air.

Moreover, the evaporator 2 and the heater core 3 are mounted inside the air-conditioning case 10 in an air flow direction in order. The temperature adjusting doors 18 and 19 are mounted between the evaporator 2 and the heater core 3 in order to adjust temperature of air discharged to the interior of the vehicle by adjusting the degree of opening of a cold air passageway bypassing the heater core 3 and a warm air passageway passing the heater core 3. Cold air and warm air passing through cold air passageway and the warm air passageway are mixed together in a mixing zone, and then, are selectively discharged to the interior of the vehicle through the vents.

The temperature adjusting door is to selectively adjust the air passing the evaporator toward the heater core or in the direction to bypass the heater core. The temperature adjusting door is a single door formed in a flat door type or a dome door type which is rotated on a rotary shaft. FIG. 1 shows an example of two temperature adjusting doors 18 and 19 disposed in the conventional air conditioner. As described above, the example that two temperature adjusting doors are disposed vertically may be applied to a structure to send air-conditioned air toward rear seats of the vehicle and a two-laminar flow structure for dividing air into indoor air and outdoor air and introduce into the interior of the vehicle.

Furthermore, FIG. 1 illustrates the temperature-adjusting door of the air conditioner in order to describe an operational structure of the door, but the door may be another door. Additionally, hereinafter, the temperature-adjusting door is called a 'door'. The first door 18 is connected to a first shaft 21 and slides by rotation of the first shaft 21, and the second door 19 is connected to a second shaft 22 and slides by rotation of the second shaft 22. The first shaft 21 and the second shaft 22 have gears, and the first door 18 and the second door 19 may have gear grooves engaging with the gears of the first and second shafts 21 and 22.

The two doors are connected to actuators and receive driving power to be operated. However, in this instance, since two actuators are disposed, the conventional air conditioner has a disadvantage in that the number of components is increased and manufacturing costs rise.

In the meantime, the two shafts for rotating the two doors may be respectively connected through a rack gear and a pinion gear and the two doors may be operated by just one actuator. However, such a structure has a disadvantage in that the degree of design freedom in mounting the actuator is deteriorated since mounting the actuator for operating the two doors is restricted in mounting positions of the doors according to mounting positions of the doors.

In addition, in case of the structure to operate the two doors through just one actuator, if the temperature-adjusting doors 18 and 19 are located at the maximum cooling position as shown by the solid line of FIG. 1 or located at the maximum warming position as shown by the dotted line of FIG. 1, there is a risk that the doors may be damaged since the rack gear moves continuously. Furthermore, the conventional air conditioner for a vehicle has another disadvantage in that possibility of misassembly gets higher since there is no misassembly preventing structure when the doors are assembled.

SUMMARY OF THE INVENTION

Accordingly, the present invention has been made to solve the above-mentioned problems occurring in the prior arts, and it is an object of the present invention to provide an air conditioner for a vehicle, which can prevent misassembly of doors and prevent damage of gears when one rack gear operates two sliding doors and increase the degree of mounting freedom of actuating means.

To accomplish the above object, according to the present invention, there is provided an air conditioner for a vehicle, which includes an air-conditioning case having a heat exchanger, and a door disposed inside the air-conditioning case and sliding to adjust the degree of opening of an air passageway, including: shafts having a first gear part geared with gear teeth formed on the door, wherein one or more misassembly preventing parts are formed on the shafts and the first gear part.

The first gear part includes: an operation gear part engaged with the gear teeth of the door; and the misassembly preventing part having a thickness different from that of the operation gear part, wherein a protrusion formed on the door is inserted into the misassembly preventing part.

Moreover, the first gear part includes a nonoperation part, which restricts sliding by being caught to the gear teeth of the door and becoming a start point of sliding.

Furthermore, the nonoperation part is thicker than the operation gear part and is formed at a position facing the misassembly preventing part.

Additionally, the protrusion formed on the door is thicker than the gear teeth.

In addition, the protrusion formed on the door is located in the middle of a sliding direction of the door.

Moreover, the misassembly preventing part includes: a changing part which is thicker than the operation gear part; and a concave groove dented in an axial direction from the changing part such that the protrusions formed on the doors are inserted therein.

In another aspect of the present invention, there is provided an air conditioner for a vehicle, which includes an air-conditioning case having a heat exchanger, and a first door and a second door, and further includes: a first shaft connected to the first door to move the first door according to rotation; a second shaft connected to the second door to move the second door according to rotation; and a rack gear for connecting and interlocking the first shaft and the second shaft, wherein at least one among the first shaft and the second shaft includes a second gear part geared with the gear teeth formed on the rack gear. Furthermore, the rack gear includes a stopper part protruding toward at least one among the first shaft and the second shaft in the width direction to restrict sliding, and the second gear part includes a first changing part getting in contact with the stopper part.

Additionally, the second gear part includes: an operation gear part engaged with the gear teeth of the rack gear; and a second changing part having a thickness different from the operation gear part and inserted into a reference groove formed in the rack gear.

In addition, the second gear part includes an operation gear part engaged with the gear teeth of the rack gear, and the first changing part is thicker than the operation gear part.

Moreover, the second changing part is formed to be opposite to the first changing part.

Furthermore, the air-conditioning case has a shaft formed to rotatably insert the shafts, at least one among the shafts has a retaining jaw protruding in a radial direction, and the shaft groove has a retaining protrusion for restricting rotation by being caught to the retaining jaw.

Additionally, an actuating means mounting part is disposed at an end portion of at least one among the shafts to be combined with a driving power source.

In addition, the actuating means mounting part is formed at all of the shafts.

The air conditioner for a vehicle according to an embodiment of the present invention can prevent misassembly of the doors, improve assemblability of the doors, enhance durability by preventing damage of the gears, and increase the degree of mounting freedom of the actuating means.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, technical structure of an air conditioner for a vehicle according to exemplary embodiments of the present invention will be described with reference to the accompanying drawings.

Figure 1:
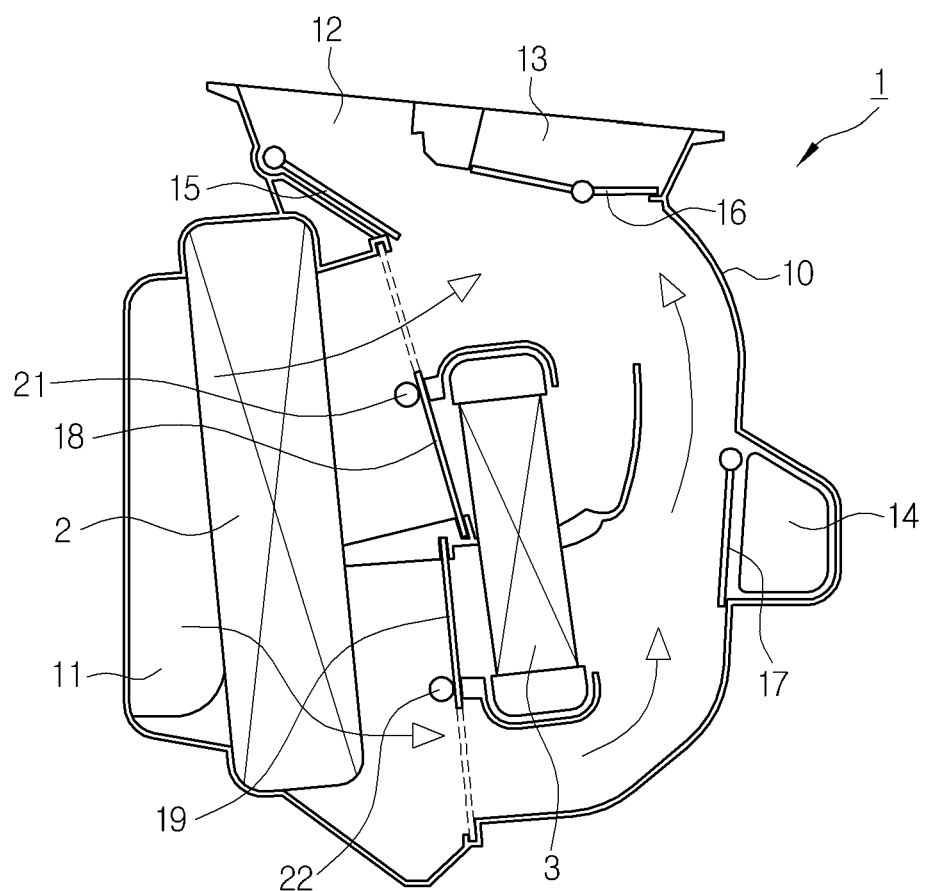
FIG. 1 is a sectional view of a conventional air conditioner for a vehicle.
Figure 2:
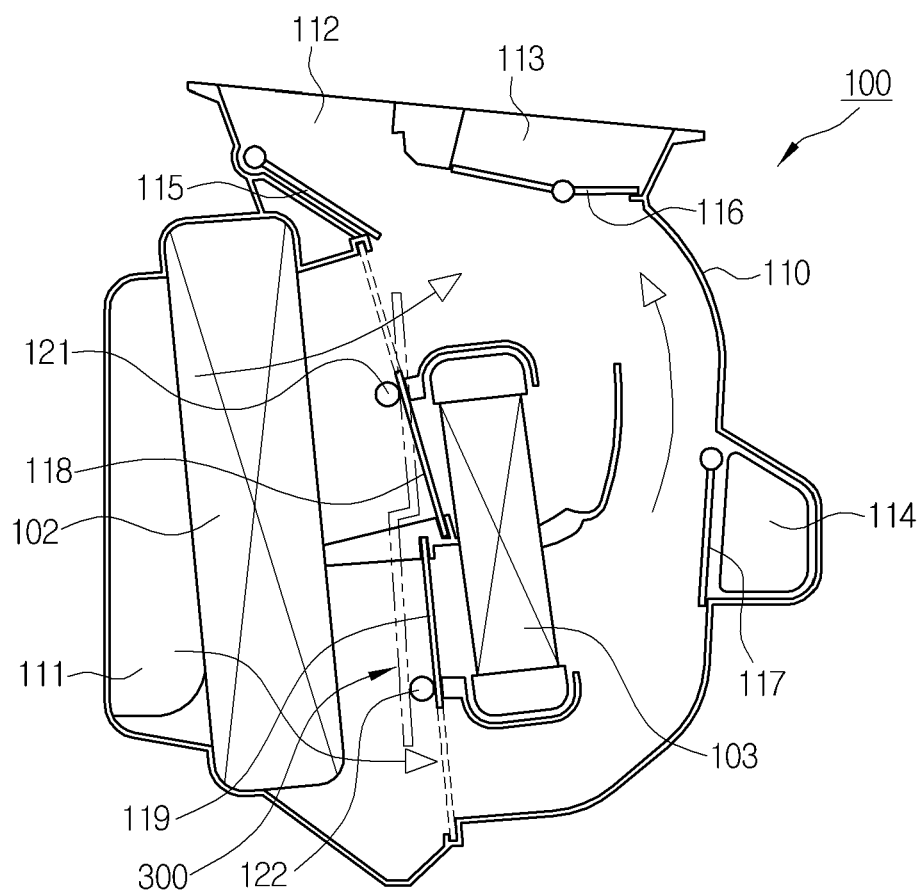
FIG. 2 is a sectional view of an air conditioner for a vehicle according to an embodiment of the present invention.

FIG. 2 is a sectional view of an air conditioner for a vehicle according to an embodiment of the present invention.

As shown in FIG. 2, the air conditioner 100 for a vehicle according to the embodiment of the present invention includes an air-conditioning case 110, an air blower (not shown), and a first door 118 and a second door 119. A heat exchanger for cooling and a heat exchanger for heating are disposed inside the air-conditioning case 110 in an air flow direction in order.

Hereinafter, the first door 118 and the second door 119 will be called a "door" when their common structure is described and will be called the first door and the second door when there is a need to discriminate them.

The heat exchanger for cooling is an evaporator 102 which cools air by exchanging heat between refrigerant of a refrigerant cycle and air, and the heat exchanger for heating is a heater core 103 which heats air by exchanging heat between cooling water of a cooling water line and air. The heat exchanger for heating may be a heat exchanger using condensation heat of a heat pump system, a PTC heater actuated by electricity, or others.

The first door 118 and the second door 119 are disposed inside the air-conditioning case 110 to adjust the degree of opening of an air passageway by sliding. In this embodiment, the first door 118 and the second door 119 are arranged to be spaced apart from each other vertically, and are temperature-adjusting doors. The temperature-adjusting doors adjust the degree of opening of an air passageway passing through the heater core 103, which is the heat exchanger for heating, and an air passageway bypassing the heater core 103.

An air inflow port 111 is formed at an inlet of the air-conditioning case 110, a defrost vent 112, a face vent 113 and a floor vent 114 for adjusting the degree of opening by mode doors 115, 116 and 117 are formed at an outlet of the air-conditioning case 110. The air blower is connected to the air inflow port 111 of the air-conditioning case 110 to blow indoor air or outdoor air. The evaporator 102 and the heater core 103 are mounted inside the air-conditioning case 110 in the air flow direction in order.

The temperature adjusting doors, namely, the first door and the second door, are mounted between the evaporator 102 and the heater core 103 in order to adjust temperature of air discharged to the interior of the vehicle by adjusting the degree of opening of a cold air passageway bypassing the heater core 103 and a warm air passageway passing through the heater core 103. Cold air and warm air passing through cold air passageway and the warm air passageway are mixed together in a mixing zone, and then, are selectively discharged to the interior of the vehicle through the vents.

The air conditioner 100 for a vehicle according to the embodiment of the present invention has two temperature-adjusting doors, namely, the first door 118 and the second door 119. As described above, the example that two temperature adjusting doors are disposed vertically may be applied to a structure to send air-conditioned air toward rear seats of the vehicle and a two-laminar flow structure for dividing air into indoor air and outdoor air and introduce into the interior of the vehicle.

Moreover, the air conditioner 100 for a vehicle according to the embodiment of the present invention includes a first shaft 121, a second shaft 122, and a rack gear 300. The first shaft 121 is connected to the first door 118 and slidably moves the first door 118 according to rotation of the first shaft 121. The second shaft 122 is connected to the second door 119 and slidably moves the second door 119 according to rotation of the second shaft 122.

Hereinafter, the first shaft 121 and the second shaft 122 will be called a "shaft" when their common structure is described and will be called the first shaft and the second shaft when there is a need to discriminate them.

Figure 3:
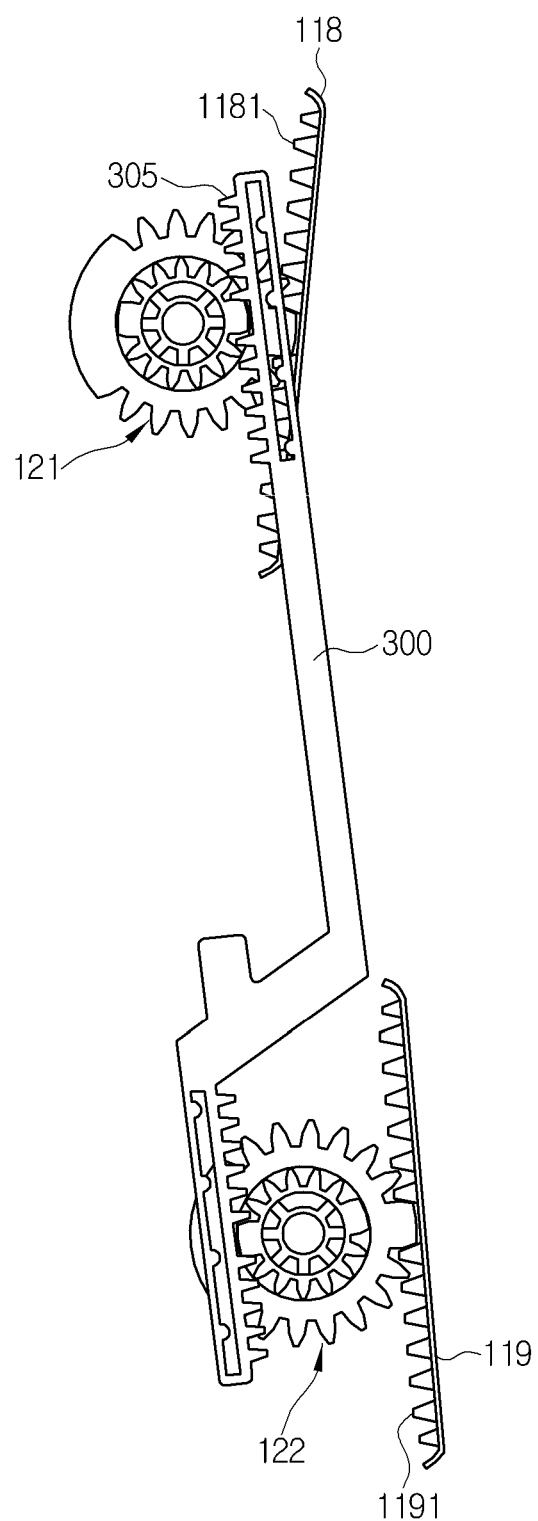
FIG. 3 is a side view showing doors, shafts and a rack gear according to the embodiment of the present invention.
Figure 4:
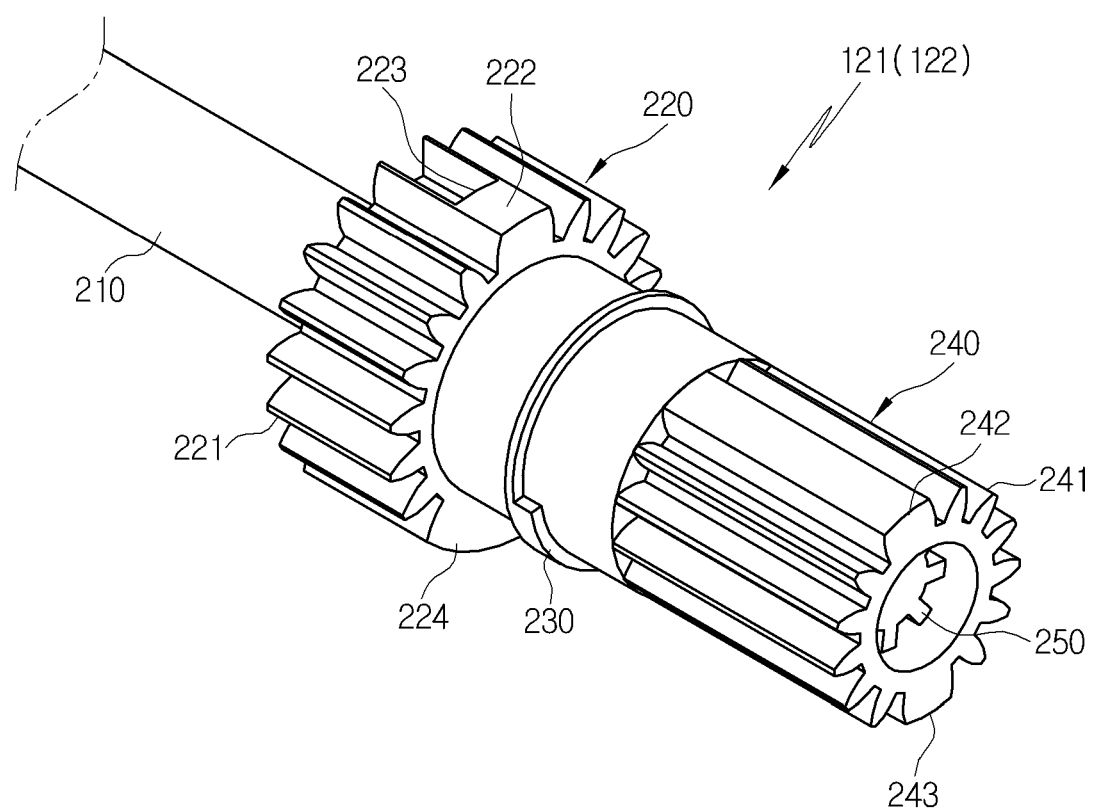
FIG. 4 is a perspective view showing the shaft according to the embodiment of the present invention.
Figure 5:
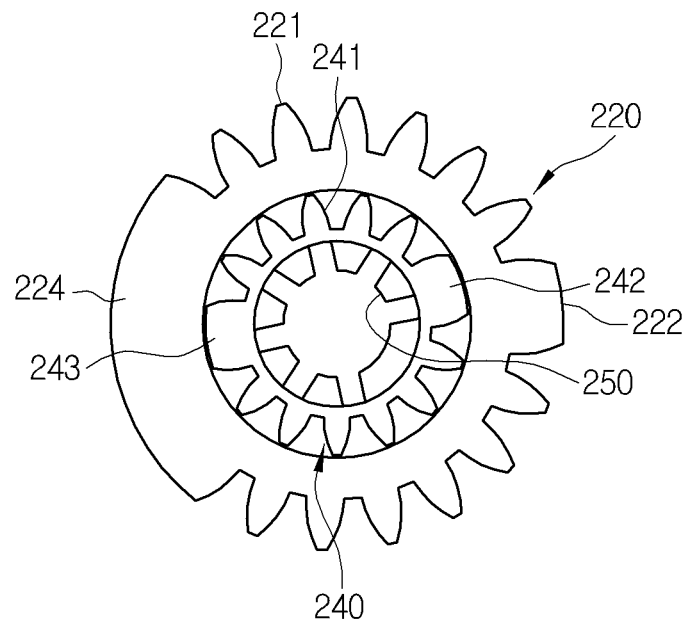
FIG. 5 is a side view showing the shaft according to the embodiment of the present invention.
Figure 6:
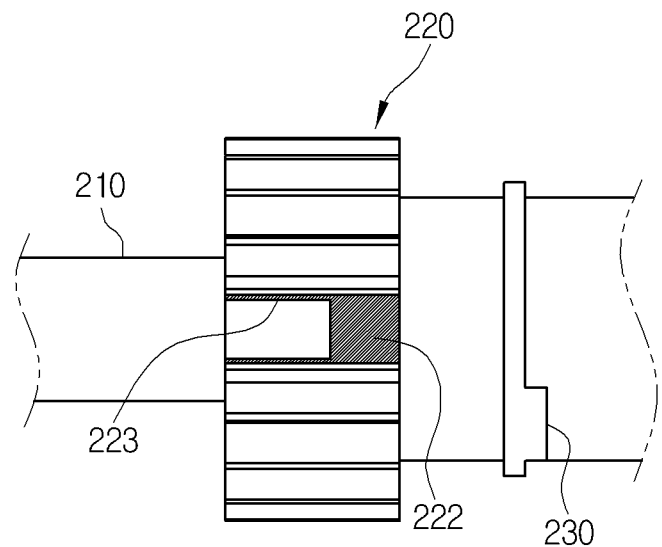
FIG. 6 is a plan view showing a part of the shaft according to the embodiment of the present invention.
Figure 7:
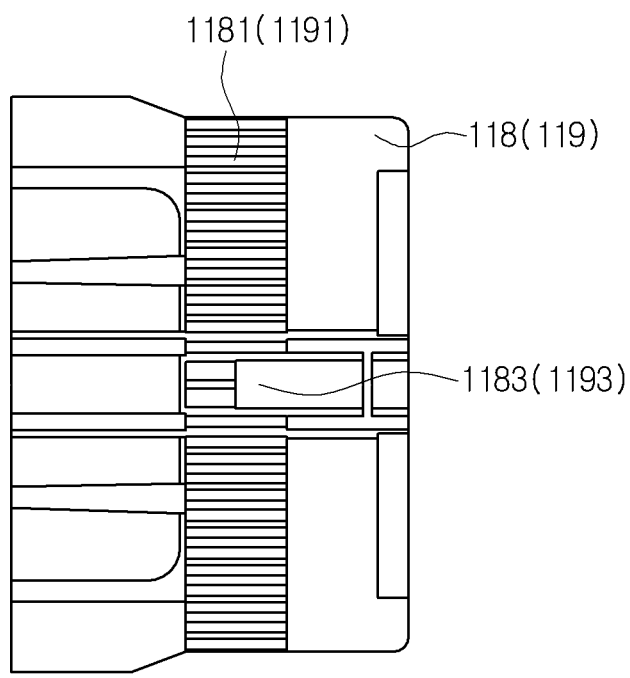
FIG. 7 is a plan view showing the door according to the embodiment of the present invention.
Figure 8:
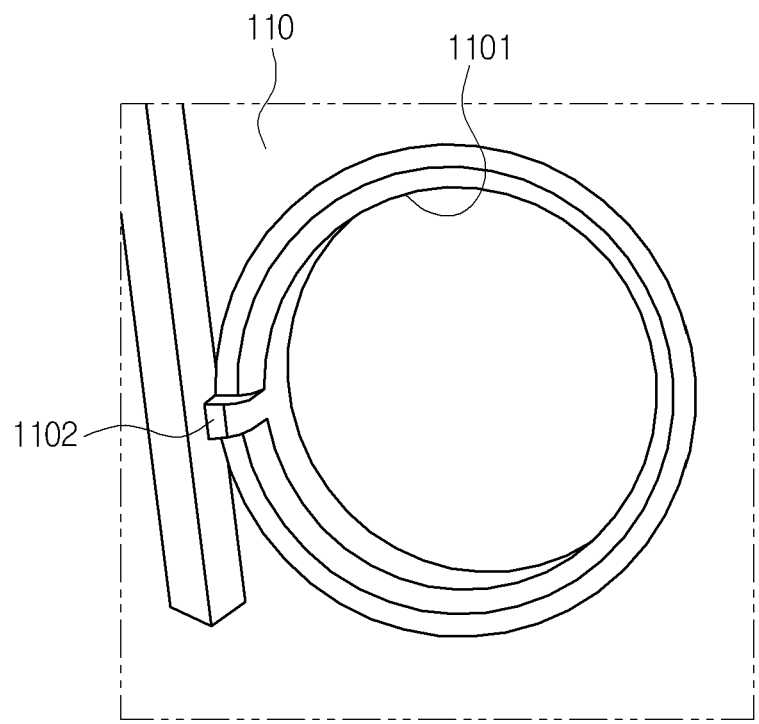
FIG. 8 is a perspective view showing a part of an air-conditioning case according to the embodiment of the present invention.
Figure 9:
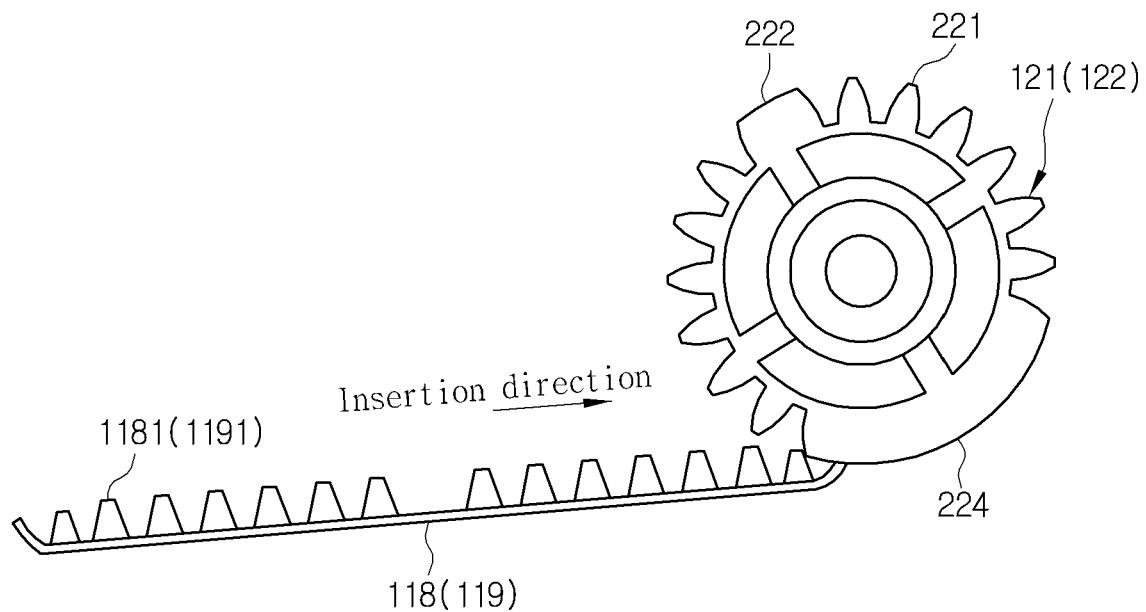
FIG. 9 is a view showing an insertion direction of the door according to the embodiment of the present invention.
Figure 10:
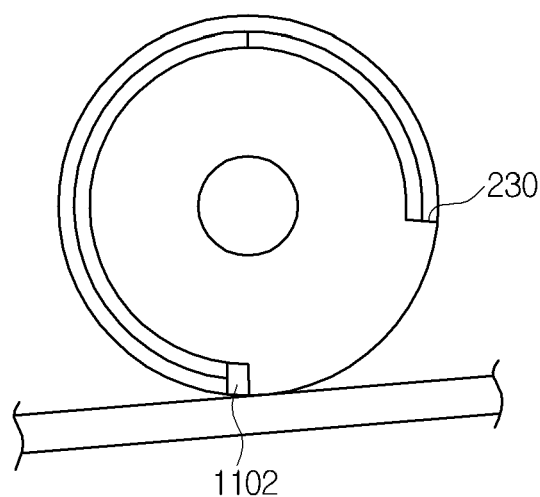
FIG. 10 is a view showing positions of a retaining jaw and a retaining protrusion shown in FIG. 9.
Figure 11:
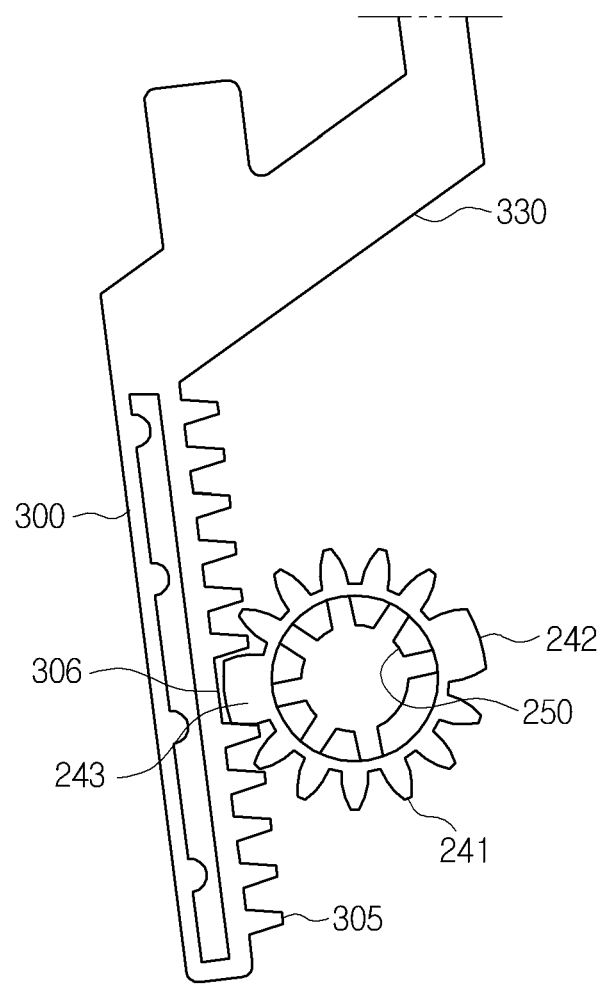
FIG. 11 is a view showing a state where a second changing part of a second gear part are inserted into a reference groove of the rack gear according to the embodiment of the present invention.
Figure 12:
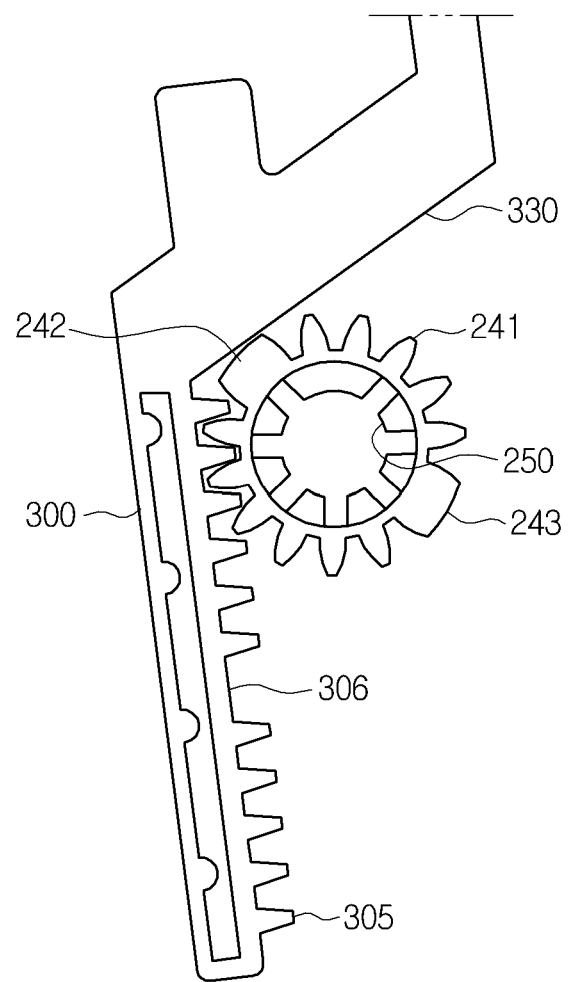
FIG. 12 is a view showing a state where a first changing part of the second gear part is caught to a stopper part of the rack gear according to the embodiment of the present invention.

FIG. 3 is a side view showing the doors, the shafts and the rack gear according to the embodiment of the present invention, FIG. 4 is a perspective view showing the shaft according to the embodiment of the present invention, FIG. 5 is a side view showing the shaft according to the embodiment of the present invention, FIG. 6 is a plan view showing a part of the shaft according to the embodiment of the present invention, FIG. 7 is a plan view showing the door according to the embodiment of the present invention, FIG. 8 is a perspective view showing a part of the air-conditioning case according to the embodiment of the present invention, FIG. 9 is a view showing an insertion direction of the door according to the embodiment of the present invention, FIG. 10 is a view showing positions of a retaining jaw and a retaining protrusion shown in FIG. 9, FIG. 11 is a view showing a state where a second changing part of a second gear part are inserted into a reference groove of the rack gear according to the embodiment of the present invention, and FIG. 12 is a view showing a state where a first changing part of the second gear part is caught to a stopper part of the rack gear according to the embodiment of the present invention.

Referring to FIGS. 3 to 12, the shafts 121 and 122 and the first gear part 220 have one or more misassembly preventing part. That is, one or more misassembly preventing parts are formed at the gear part, and one or more misassembly preventing parts are formed at a shaft body. Due to the plurality of misassembly preventing parts, even if one misassembly preventing part loses its function, the present invention can lower probability of misassembly by preventing misassembly doubly or triply since the remaining misassembly preventing parts prevent misassembly.

The first door 118 is formed in a plate shape having a predetermined thickness. Gear teeth 1181 are formed at both sides of the first door 118 in a width direction of the vehicle. The width direction of the vehicle is an axial direction of the door. The gear teeth 1181 of the first door extends in a sliding direction of the door, and engage with the first shaft 121. The second door 119 is formed in a plate shape having a predetermined thickness. Gear teeth 1191 extend at both axial sides of the second door 119 in a sliding direction of the door and engage with the second shaft 122.

The shafts 121 and 122 include shaft parts 210 formed long in the width direction of the vehicle, and first and second gear parts 220 and 240. The structure of the shafts which will be described hereinafter may be applied to the first shaft 121 or the second shaft or all of the first and second shafts 121 and 122.

The first gear part 220 is disposed on the outer circumferential surface of the shaft part 210 and geared with the gear teeth 1181 and 1191 formed on the doors 118 and 119. The first gear part 220 is arranged inside the air-conditioning case 110. The doors 118 and 119 slide vertically depending on the rotation of the first gear part 220.

The first gear part 220 includes an operation gear part 221, a misassembly preventing part, and a nonoperation part 224. The operation gear part 221 functions to transfer driving power by engaging with the gear teeth 1181 and 1191 of the doors 118 and 119. The operation gear part 221 has the same thickness and pitch and is formed uniformly.

The misassembly preventing part has a thickness different from that of the operation gear part 221, and inserts protrusions 1183 and 1193 formed on the doors 118 and 119. The protrusions 1183 and 1193 formed on the doors 118 and 119 are thicker than the gear teeth 1181 and 1191. The protrusions 1183 and 1193 formed on the doors 118 and 119 are located in the middle of the sliding direction of the doors. The protrusions 1183 and 1193 make operation of the doors impossible when the doors are misassembled and reinforce strength of the doors by functioning as ribs. The protrusions 1183 and 1193 can enhance reinforcing performance by being located in the middle of the sliding direction of the doors.

The misassembly preventing part includes: a changing part 222 being thicker than that of the operation gear part 221; and a concave groove 223 dented in an axial direction from the changing part 222 such that the protrusions formed on the doors are inserted therein. If the doors are assembled correctly, the protrusions 1183 and 1193 of the doors are engaged with the concave groove 223 formed in the changing part 222 to transfer driving power. If the doors are misassembled, the gear teeth 1181 and 1191 of the doors are caught to the changing part 222 and are not engaged with the concave groove 223, so the doors are not operated.

That is, if the doors are misassembled at wrong positions, for instance, even if one or two screw threads are mislocated, the doors are not opened or closed fully. The misassembly preventing part can check misassembly since preventing operation of the doors when the doors are misassembled. The concave groove 223 is dented to an approximately intermediate portion of the changing part 222 in an axial direction or dented deeper or lower than the intermediate portion of the changing part 222 in order to prevent misassembly in the sliding direction of the doors and to prevent misassembly in the axial direction.

The nonoperation part 224 restrict sliding of the doors 118 and 119 since the gear teeth 1181 and 1191 of the doors 118 and 119 are caught to the nonoperation part 224. Moreover, the nonoperation part 224 becomes a start point of door sliding. The nonoperation part 224 is thicker than the operation gear part 221. Therefore, the nonoperation part 224 does not transfer driving power since not engaging with the gear teeth 1181 and 1191. The nonoperation part 224 acts as an assembly reference point when being assembled with the doors, and functions as a stopper to restrict rotation.

Furthermore, the nonoperation part 224 is formed at a position opposite to the misassembly preventing part. That is, the nonoperation part 224 and the misassembly preventing part face each other at an interval of 180 degrees. Through such a structure, the gear teeth of the doors which start to engage each other at the nonoperation part 224 have the protrusion corresponding to the misassembly preventing part located at the interval of 180 degrees from the nonoperation part 224. As described above, since the protrusion is arranged at the approximately middle position in the sliding direction of the door to increase structural strength and operational stability.

Because the nonoperation part 224 becomes the assembly reference point when the door is assembled, as shown in FIG. 9, the nonoperation part 224 is slidably inserted into the air-conditioning case 110 when the outermost gear teeth 1181 and 1191 of the doors 118 and 119 are located at an end portion of the nonoperation part 224, so that assembly is achieved. That is, the first gear teeth 1181 and 1191 of the doors 118 and 119 are located next to the nonoperation part 224.

The second gear part 240 has at least one among the first shaft 121 and the second shaft 122, and in this embodiment, the second gear part 240 has all of the first shaft 121 and the second shaft 122. The second gear part 240 is geared with the gear teeth 305 formed on the rack gear 300.

The rack gear 300 has a stopper part 330. The stopper part 330 protrudes in the width direction toward at least one among the first shaft 121 and the second shaft 122 to restrict sliding of the door.

The second gear part 240 includes an operation gear part 241, a first changing part 242 and a second changing part 243. The operation gear part 241 engages with the gear teeth 305 of the rack gear 300 to transfer driving power. The operation gear part 241 has the same thickness and pitch and is formed uniformly.

The first changing part 242 gets in contact with the stopper part 330. The first changing part 242 is thicker than the operation gear part 241. The first changing part 242 can prevent damage of the operation gear part 241 when the operation gear part 241 gets in contact with the stopper part 330 since getting in contact with the stopper part 330 of the rack gear 300. The first changing part 242 does not engage with the gear teeth 305 of the rack gear 300 and does not transfer driving power since being thicker than the operation gear part 241.

The second changing part 243 has a thickness different from that of the operation gear part 241, and preferably, is thicker than the operation gear part 241. The second changing part 243 is inserted into a reference groove 306 formed in the rack gear 300 and is engaged with the reference groove 306. The second changing part 243 serves as a reference point when the rack gear 300 is assembled. The second changing part 243 is formed at a position opposite to the first changing part 242. That is, the first changing part 242 and the second changing part 243 face each other at an interval of 180 degrees.

Additionally, at least one among the shafts 121 and 122 has a retaining jaw 230. In this embodiment, all of the first shaft 121 and the second shaft 122 have the retaining jaws 230. The retaining jaws 230 protrude from the outer circumferential surface of the shaft part 210 in a radial direction. Moreover, the air-conditioning case 110 has a shaft hole 1101 in which the shafts 121 and 122 are inserted rotatably. The shaft hole 1101 has a retaining protrusion 1102 for restricting rotation by being caught to the retaining jaw 230.

The retaining jaw 230 and the retaining protrusion 1102 are to set an assembly start point of the doors like the nonoperation part 224. That is, if one end of the retaining jaw 230 formed on the shaft is caught to the retaining protrusion 1102, the nonoperation part 224 of the shaft is always located at a start position of the gear teeth 1181 and 1191 of the doors in order to prevent misassembly.

Furthermore, at least one among the shafts 121 and 122 has an actuating means mounting part 250 disposed at one end portion thereof. In this embodiment, the actuating means mounting parts 250 are formed at all of the shafts 121 and 122.

The actuating means mounting part 250 is combined with a driving power source, and the driving power source may be an actuator. The actuating means mounting part 250 is concavely formed at an end portion of the shaft, namely, at an end portion of the second gear part 240. A driving shaft of the actuator is inserted into the actuating means mounting part 250 to transfer driving power.

The actuating means mounting parts 250 enhance the degree of design freedom by varying a mounting position of the actuating means since being disposed at all of the first shaft 121 and the second shaft 122.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. An air conditioner for a vehicle, comprising:
   an air-conditioning case having a heat exchanger, and a first door and a second door disposed inside the air-conditioning case and configured to slidingly adjust a degree of opening of an air passageway,
   a first shaft having a first gear part geared with gear teeth formed on the first door,
   a second shaft having a second gear part geared with gear teeth formed on the second door,
   a rack gear for connecting and interlocking the first shaft and the second shaft,
   wherein the first gear part comprises an first operation gear part engaged with the gear teeth of the first door and a misassembly preventing part comprising a first changing part which is thicker than the first operation gear part and a concave groove dented in an axial direction from the first changing part such that a protrusion formed on the door is inserted into the concave groove,
   wherein a nonoperation part having a thickness greater than that of the first operation gear part is caught by the gear teeth of the first door to limit sliding and becomes a starting point of sliding,
   wherein the nonoperation part is formed on an opposite side of the first gear part from the misassembly preventing part, and
   wherein the protrusion formed on the first door is thicker than the gear teeth of the first door.

2. The air conditioner according to claim 1, wherein the protrusion formed on the first door is located in a middle of a sliding direction of the first door.

3. The air conditioner according to claim 1, wherein the rack gear includes a stopper part protruding toward at least one among the first shaft and the second shaft in a width direction to restrict sliding, and the second gear part includes a second changing part getting in contact with the stopper part.

4. The air conditioner according to claim 3, wherein the second gear part includes: a second operation gear part engaged with gear teeth of the rack gear; and a third changing part having a thickness different from the operation gear part and inserted into a reference groove formed in the rack gear.

5. The air conditioner according to claim 3, wherein the second gear part includes a second operation gear part engaged with gear teeth of the rack gear, and wherein the second changing part is thicker than the second operation gear part.

6. The air conditioner according to claim 4, wherein the third changing part is formed on an opposite side of second gear part from the second changing part.

7. The air conditioner according to claim 1, wherein the air-conditioning case has a through-hole formed to rotatably insert the first shaft or the second shaft,
wherein at least one of the first shaft or the second shaft has a retaining jaw protruding in a radial direction, and
wherein the through-hole has a retaining protrusion for restricting rotation of the at least one of the first shaft or the second shaft by being caught to the retaining jaw.

8. The air conditioner according to claim 1, wherein an actuating means mounting part is disposed at an end portion of at least one of the first shaft or the second shaft to be combined with a driving power source.

\* \* \* \* \*